United States Patent Office 3,766,103
Patented Oct. 16, 1973

3,766,103
PREPARATION OF FOAMS CHARACTERIZED BY CARBODIIMIDE LINKAGES
John T. Patton, Jr., Wyandotte, Moses Cenker, Trenton, and Peter T. Kan, Plymouth, Mich., assignors to BASF Wyandotte Corporation, Wyandotte, Mich.
No Drawing. Original application Dec. 13, 1971, Ser. No. 207,567. Divided and this application Dec. 29, 1972, Ser. No. 319,541
Int. Cl. C08g 33/02
U.S. Cl. 260—2.5 BF                                          8 Claims

ABSTRACT OF THE DISCLOSURE

An adduct of 1,3,5-tris(3-dimethylaminopropyl)-s-hexahydrotriazine, an alkylene oxide and water has been found to be extremely active as a co-catalyst useful in the preparation of rigid cellular plastics characterized by carbodiimide linkages.

---

The present application is a division of copending U.S. patent application Ser. No. 207,567, filed Dec. 13, 1971.

BACKGROUND OF THE INVENTION

(1) Field of the invention

The present invention relates to the use of novel substituted hexahydrotriazine adducts as catalysts in the preparation of foams characterized by carbodiimide linkages. More particularly, the present invention relates to substituted hexahydrotriazine adducts of alkylene oxide and water as catalysts in the preparation of rigid foams characterized by carbodiimide linkages.

(2) Prior art

In U.S. Pat. No. 2,993,870 there is taught the use of certain hexahydrotriazine compounds for the catalytic trimerization of an organic polyisocyanate to form isocyanurate compositions. Although these compounds are eminently useful in their intended environment, their catalytic activity is not sufficiently active to be completely efficacious as co-catalysts in the preparation of carbodiimide-containing rigid cellular plastics. Other known trimer catalysts suffer from this same deficiency in preparing carbodiimide-containing foams prepared therewith.

SUMMARY OF THE INVENTION

The present invention provides hexahydrotriazine adduct compounds which, due to their excellent catalytic activity, are extremely useful as a component for a co-catalyst system in the preparation of rigid cellular plastics characterized by carbodiimide linkages.

Generally, these compounds are hexahydrotriazine adducts prepared by reacting a 1,3,5-tris(dialkylaminoalkyl)-s-hexahydrotriazine, alkylene oxide and water. The compounds are, presumably, quaternary ammonium hydroxides.

For a more comprehensive discussion of the present invention, reference is made to the following detailed description and examples thereof.

DESCRIPTION OF THE PREFERRED EMBODIMENTS

In accordance with the present invention, new compositions of matter which are useful in the preparation of rigid foams characterized by carbodiimide linkages, hereinafter referred to as carbodiimide foams for purposes of brevity, are provided by reacting a 1,3,5-tris(dialkylaminoalkyl) - s - hexahydrotriazine or 1,3,5-tris (N,N - dialkylaminoalkyl)-s-hexahydrotriazine, alkylene oxide and water.

The product of the reaction is presumably a quaternary ammonium hydroxide having a postulated structure corresponding to the following:

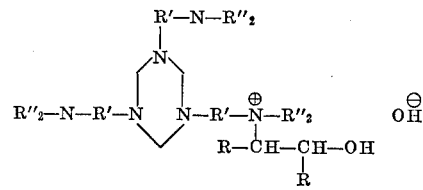

wherein each R, individually, is hydrogen or lower alkyl such as methyl, ethyl, propyl, isopropyl, butyl, t-butyl, isobutyl, pentyl and the like, R″ is lower alkyl, such as those described for R, and R′ is alkylene such as ethylene, propylene, butylene and the like.

It should be noted that in regard to the above-proposed structure, there are six tertiary nitrogens in the 1,3,5-tris (dialkylaminoalkyl)-s-hexahydrotriazine and that each of these sites could serve as the point of formation for the quaternary ammonium hydroxide. Also, the hydroxyl group may be either primary or secondary.

For purposes of brevity, the above representative structure will be used throughout this application.

Representative of the hexahydrotriazine compounds useful herein are, for example, 1,3,5-tris(N,N-dimethyl-2-aminoethyl) - s - hexahydrotriazine; 1,3,5-tris(N,N-dimethyl-3-aminopropyl)-s-hexahydrotriazine and the like; 1,3,5-tris(N,N-diethyl-2-aminoethyl) - s - hexahydrotriazine; 1,3,5 - tris(N,N-diethyl-3-aminopropyl)-s-hexahydrotriazine and the like; 1,3,5-tris(N,N-dipropyl-2-aminoethyl)-s-hexahydrotriazine and the like; and so forth. In the practice of the present invention, it is preferred to employ 1,3,5 - tris(N,N-dimethyl-3-aminopropyl)-s-hexahydrotriazine which can also be described as 1,3,5-tris(3-dimethylaminopropyl)-s-hexahydrotriazine.

The 1,3,5 - tris(dialkylaminoalkyl) - s - hexahydrotriazine contemplated for use herein is generally prepared by reacting, at a temperature of about 0° C. to about 20° C., equimolar amounts of dialkylaminoalkylamine and a 37% aqueous solution of formaldehyde (formalin). More particularly, the amine and formaldehyde are mixed together, with gentle stirring at about 0° C. Thereafter, and with continuous gentle stirring, the resulting mixture is allowed to warm up to room temperature. The hexahydrotriazine is then recovered by first salting out the mixture with a strong base such as potassium hydroxide or sodium hydroxide and then purifying by distillation.

Thus, for example, the preferred hexahydrotriazine, 1,3,5 - tris(N,N - dimethyl - 3 - aminopropyl)-s-hexahydrotriazine is prepared by mixing together dimethylaminopropylamine and formalin at about 0° C. With continuous stirring the mixture is then allowed to warm up to room temperature. The excess reagents are then salted out by the addition thereto of potassium hydroxide and the remaining hexahydrotriazine is then purified by distillation. The hexahydrotriazine compounds contemplated herein and their method of preparation are more particularly described by Nicholas et al., Journal of Cellular Plastics, 1(1), 85 (1965) and by Graymore, Journal of Chemical Society, 1493 (1931).

The alkylene oxides which may be employed in the preparation of the catalysts of use in the subject invention are those having from 2 to 12 carbon atoms such as ethylene oxide, propylene oxide, the isomeric normal butylene oxides, hexylene oxide, octylene oxide, dodecene oxide, methoxy and other alkoxy propylene oxides, styrene oxide, and cyclohexene oxide. Halogenated alkylene oxides having from 2 to 4 carbon atoms and from 1 to 4 halogen atoms may also be used, such as epichlorohydrin, epiiodohydrin, epibromohydrin, 3,3-dichloropropylene oxide, 3-chloro-1,2-epoxypropane, 3-chloro-1,2-epoxybutane, 1 - chloro - 2,3 - epoxybutane, 3,4-dichloro-1,2 - epoxybutane, 1,4 - dichloro-2,3-epoxybutane, 1-chloro-2,3-epoxybutane, and 3,3,3 - trichloropropylene oxide. Mixtures of any of the above alkylene oxides may also be employed.

As exemplifying the present invention, when 1,3,5-tris(N,N - dimethyl - 3 - aminopropyl)-s-hexahydrotriazine and propylene oxide are used in the preparation of the present adducts, the resulting quaternary ammonium hydroxide can be represented by the following postulated structure:

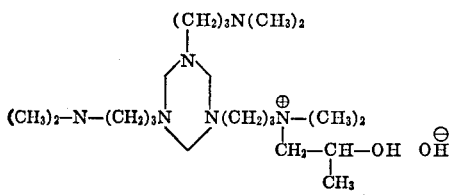

wherein one R is hydrogen, the other R is methyl, R" is methyl and R' is propylene.

The present adducts are generally prepared by reacting substantially equimolar amounts of hexahydrotriazine, alkylene oxide and water. The reaction generally proceeds at a temperature ranging from about 10° C. to 80° C. for a period of from about 5 to 120 minutes. It should be noted that when reacting the alkylene oxide, as more explicitly defined hereinafter, the reaction can proceed at a pressure ranging from about atmospheric to upwards of about 50 p.s.i.g.

Any conventional method of reaction can be employed in the practice of the present invention, such as:

(1) reacting the hexahydrotriazine and alkylene oxide, at atmospheric or elevated pressure for a period ranging from about 5 to 60 minutes, preferably 15 to 30 minutes, and at a temperature of from about 10° C. to 35° C., preferably 20° C. to 30° C., and then adding and reacting water therewith at a temperature of from about 25° C. to 80° C. preferably 40° C. to 60° C. for a period of from 10 to 60 minutes, preferably 15 to 40 minutes;

(2) adding water to the hexahydrotriazine followed therewith by the alkylene oxide addition, this mode of reaction being carried out under the same reaction conditions defined above; and (3) concurrently, but separately, adding to and reacting the alkylene oxide and water with the hexahydrotriazine at a temperature of from about 10 to 80° C., preferably 20 to 60° C., for a period of from about 5 to 60 minutes, preferably 15 to 40 minutes.

Any of these methods will work with equal efficacy herein. The only criticality attached to the process is that the alkylene oxide and water not react with each other.

The hexahydrotriazine adducts of the present invention are highly viscous products, which, in the utilization thereof, are employed, optionally, as solutions thereof in a solvent inert to the catalyst such as, tetrahydrofuran, dioxane, N,N-dimethyl formamide, dimethylsulfoxide, ethylene glycol, propylene glycol, dipropylene glycol and high molecular weight polyols.

In another aspect of the present invention there is provided a method for the preparation of carbodiimide foams utilizing the present hexahydrotriazine adducts. The preparation of the foam by the catalytic condensation of an organic polyisocyanate form a co-catalyst system at a temperature ranging from about room temperature to about 100° C. is more particularly described in copending U.S. patent application Ser. Nos. 157,025, filed June 25, 1971, now U.S. Pat. No. 3,723,366; 118,994, filed Feb. 25, 1971; and Ser. No. 169,470, filed Aug. 5, 1971, now U.S. Pat. No. 3,717,596, the disclosures of which are hereby incorporated by reference.

Generally, these applications teach the use of either a 2,4,6-tris(dialkanolamino) - s - triazine or 2,4,6-tris(N-methylethanolamino)-s-triazine as carbodiimide formation catalysts in conjoint use with varying trimer catalysts. According to the present invention, either of these primary catalysts is used in the preparation of the foams by any of the methods described in the copending applications, but using the present adduct as the other element of the co-catalyst system.

Generally, the co-catalyst system will be utilized in an amount ranging from 1 to 10 parts by weight thereof per 100 parts by weight of polyisocyanate, and preferably, from about 2 to 4 parts by weight thereof per 100 parts by weight of organic polyisocyanate.

The co-catalyst system is prepared in a weight ratio of triazine to hexahydrotriazine adduct ranging from about 1:10 to 10:1 and preferably from about 1:3 to 3:1.

It is preferred, however, to employ a co-catalyst system of 2,4,6-tris(N-methylethanolamino) - s - triazine, a compound more particularly described in the above-referred to Ser. No. 169,470 and the hereinafter described preferred hexahydrotriazine adduct.

Further, in preparing these foams, additional ingredients such as blowing agents, active-hydrogen containing compounds, plasticizers, surfactants and the like can be utilized in a manner described in the above-referred to copending applications as well as in copending application U.S. Ser. No. 169,526, the disclosure of which is also incorporated by reference.

In addition to their heretofore described utility, the instant hexahydrotriazine adducts are also useful as isocyanurate foam formation catalysts and the like.

For a more complete understanding of the present invention, reference is made to the following examples. In the examples all parts, absent indications to the contrary, are by weight.

EXAMPLE I

This example illustrates the preparation of a hexahydrotriazine adduct in accordance with the present invention.

Into a suitable reaction vessel equipped with heating means and stirring means and dropping funnel is placed 136.8 parts (0.4 mole) of 1,3,5-tris(N,N-dimethyl-3-aminopropyl)-s-hexahydrotriazine. When stirring and at a temperature of about 27° C., 23.2 parts (0.4 mole) of propylene oxide is slowly added thereto over about a fifteen minute period. After stirring the mixture for an additional ten minutes and maintaining the temperature at about 27° C., 7.2 parts (0.4 mole) of water is slowly added thereto, with stirring, in a period of about fifteen minutes.

The resulting mixture is then heated up to about 50° C. and is maintained thereat for about twenty minutes to ensure complete reaction. The resulting product is then cooled and dissolved in dipropylene glycol to facilitate handling.

EXAMPLE II

At room temperature to a 200 ml. round-bottomed flask equipped with stirring means, thermometer and an addition funnel containing 18.0 parts (0.25 mole) of a 1,2- and 2,3-isomeric mixture of butylene oxide, is charged 85.5 parts (0.25 mole) of 1,3,5-tris(3-dimethyl-aminopropyl)-s-hexhydrotriazine. Thereafter, 4.5 parts (0.25 mole) of water is added thereto. The triazine-water mixture is then vigorously stirred over a twenty minute period during which time the butylene oxide is added to the triazine-water mixture. During the oxide addition, the temperature within the flask is allowed to warm to about 45° to 50° C. and is maintained thereat by utilizing a cooling bath.

After the twenty minute addition period has lapsed, the resulting mixture is then stirred for an additional thirty minutes while maintaining a 50° C. maximum temperature.

The resulting product is then allowed to cool to about room temperature and is then dissolved in 220 parts of dipropylene glycol to form a 33% solution thereof.

EXAMPLE III

To a one-liter, electrically-heated, water-cooled autoclave equipped with stirring means is charged a mixture of 342 parts (1.0 mole) of 1,3,5-tris(N,N-dimethyl-3-aminopropyl)-s-hexahydrotriazine and 20 parts (1.1 moles) of water. A pressure bomb operatively connected to the autoclave is charged with 44.0 parts (1.0 mole) of ethylene oxide. Over a period of about 70 minutes the ethylene oxide in the pressure bomb is added to the stirred triazine-water mixture. During this oxide addition, the temperature in the autoclave is maintained at a maximum of about 35° C. via the cooling means and the slow rate of addition. At the conclusion of the addition the maximum pressure in the autoclave is about 45 p.s.i.g.

After the oxide addition is completed, the reaction mixture is slowly heated, with stirring, to about 45° to 50° C. and is maintained thereat for about 30 minutes while the pressure in the autoclave decreases to a constant value.

The reaction product is then cooled to room temperature, recovered, and dissolved in 820 parts of dipropylene glycol to provide a 33% solution.

EXAMPLE IV

This example illustrates the preparation of carbodiimide foams from the hexahydrotriazine adducts of the present invention.

A series of carbodiimide foams are prepared at room temperature by the following procedure:

To a suitable reaction vessel is added an organic polyisocyanate. A halohydrocarbon auxiliary blowing agent is then mixed with the polyisocyanate in a manner substantially described in U.S. patent application Ser. No. 169,526, filed Aug. 5, 1971. Thereafter, using a sequential addition process, as described in Ser. No. 157,025, there is added to the polyisocyanate, 2,4,6-tris(N-methyethanolamine)-s-triazine followed thereafter by the addition thereto of a 33% solution of the hexahydrotriazine adduct of Example I in dipropylene glycol. The resulting mixture is then gently stirred and after a few seconds in exotherm is developed in the vessel followed shortly by the beginning of foam formation. After a few minutes the reaction is completed and rigid cellular foams characterized by carbodiimide linkages are obtained.

It should be noted that where plasticizers, surfactants, active hydrogen-containing compounds and the like are used, they are pre-mixed with the triazine catalyst to facilitate their introduction and in a manner as substantially described in Ser. Nos. 185,910 and 169,470, except that the acrylonitrile-grafted polyol of Ser. No. 185,910, where used, is pre-mixed with the hexahydrotriazine adducts.

Table I, below, sets forth the ingredients used to prepare the foams, as well as the amounts thereof and some of the physical properties of the resulting foams.

TABLE I

| Foam | Isocyanate TDI[1] | Isocyanate MDI[2] | Halo-hydro-carbon[3] | Hexa-hydrotriazine adduct[4] | Acrylonitrile polyol[5] | Triazine catalyst | Plasticizer[6] | Surfactant[7] | Percent closed cell | Density, #/ft.[3] | Compressive strength, p.s.i., 10% deflection |
|---|---|---|---|---|---|---|---|---|---|---|---|
| A | 30 | 70 | 15 | 1.0 | | 1.65 | 1.1 | 0.55 | 88 | 1.98 | 25 |
| B | 20 | 80 | 15 | 1.0 | | 1.65 | 1.1 | 0.55 | 65 | 2.28 | 31 |
| C | 10 | 90 | 15 | 1.0 | | 1.65 | 1.1 | 0.55 | 85 | 2.51 | 39 |
| D | | 100 | 15 | 1.0 | | 1.65 | 1.1 | 0.55 | 88 | 2.58 | 32 |
| E | 30 | 70 | 15 | 1.0 | 2.1 | 1.65 | 1.1 | 0.55 | 93 | 2.05 | 27 |
| F | 20 | 80 | 15 | 1.1 | 2.3 | 1.80 | 1.2 | 0.60 | 95 | 2.48 | 37 |
| G | 10 | 90 | 15 | 1.2 | 2.5 | 1.95 | 1.3 | 0.65 | 93 | 2.68 | 36 |
| H | | 100 | 15 | 1.3 | 2.7 | 2.10 | 1.4 | 0.70 | 95 | 2.42 | 40 |
| I | 30 | 70 | 15 | 1.0 | 5.2 | 1.65 | 1.1 | 0.55 | 93 | 2.88 | 44 |
| J | 20 | 80 | 15 | 1.1 | 5.7 | 1.80 | 1.2 | 0.60 | 94 | 2.93 | 45 |
| K | 10 | 90 | 15 | 1.2 | 6.3 | 1.95 | 1.3 | 0.65 | 96 | 2.76 | 53 |
| L | | 100 | 15 | 1.3 | 6.8 | 2.10 | 1.4 | 0.70 | 94 | 2.83 | 47 |
| M | 30 | 70 | 15 | 1.0 | 10.2 | 1.65 | 1.1 | 0.55 | 93 | 3.16 | 50 |
| N | 20 | 80 | 15 | 1.1 | 11.2 | 1.80 | 1.2 | 0.60 | 96 | 3.05 | 54 |
| O | 10 | 90 | 15 | 1.2 | 12.1 | 1.95 | 1.3 | 0.65 | 95 | 3.15 | 55 |
| P | | 100 | 15 | 1.3 | 13.0 | 2.10 | 1.4 | 0.70 | 94 | 3.35 | 53 |

[1] An 80:20 weight mixture of 2,4- and 2,6-toluene diisocyanate.
[2] Crude methylene diphenyl diisocyanate.
[3] Freon 113:1,1,2-trichloro-1,2,2-trifluoroethane.
[4] Used as a 33% solution in dipropylene glycol.
[5] An acrylonitrile graft polyol sold by Union Carbide under the trademark NIAX 31-45, and which typically is a yellow opaque liquid having a viscosity of about 1,700 cps. at 25° C., a molecular weight of about 3,700, a hydroxyl number of 43 to 47 and a water content of about 0.10% by weight, max.
[6] Tris (2-chloroethyl)phosphate.
[7] A polysiloxane sold by Dow Chemical under the name DC-193.

EXAMPLE V

To evidence the excellent flame retardancy of the foams prepared with the present hexahydrotriazine adducts, the foams of Example IV are flame tested in accordance with the Butler Chimney Test, as described by, Kruger et al., SPE 25th Antec, vol. XIII, Detroit, Mich., 1969, pp. 1052–1057.

The results of these tests are set forth below in Table II.

TABLE II

| Foam | Flame height, inches | Percent weight, retention | Smoke |
|---|---|---|---|
| A | 3 | 97 | Very light. |
| B | 4 | 97 | Do. |
| C | 3 | 97 | Do. |
| D | 3 | 97 | Do. |
| E | 4 | 96 | Light. |
| F | 4 | 96 | Do. |
| G | 5 | 95 | Do. |
| H | 4 | 96 | Do. |
| I | 4 | 96 | Do. |
| J | 5 | 97 | Med. light. |
| K | 4 | 97 | Light. |
| L | 5 | 97 | Do. |
| M | 5 | 96 | Do. |
| N | 4 | 96 | Do. |
| O | 5 | 97 | Do. |
| P | 5 | 97 | Medium. |

It can be seen from the above that all of the foams are characterized by excellent weight retention, very low smoke evolution and flame retardancy.

The embodiments of the invention in which an exclusive property or privilege is claimed are defined as follows:

1. In a process for the preparation of a rigid cellular foam characterized by carboiimide linkages of the type wherein an organic polyisocyanate is catalytically condensed in the presence of a co-catalyst system consisting essentially of a carbodiimide catalyst and a trimer catalyst, the improvement which comprises employing as the trimer catalyst a composition consisting essentially of a hexahydrotriazine adduct which is the reaction product of substantially equimolar amounts of (a) a 1,3,5-tris- (N,N-dialkylaminoalkyl)-s-hexahydrotriazine, (b) an alkylene oxide and (c) water.

2. The process of claim 1 wherein the carbodiimide catalyst is selected from the group consisting of 2,4,6-tris(dialkanolamino)-s-triazine and 2,4,6-tris(N-methylethanolamino)-s-triazine.

3. The process of claim 1 wherein the hexahydrotriazine is 1,3,5-tris(N,N-dimethyl-3-aminopropyl)-s-hexahydrotriazine.

4. The process of claim 1 wherein the alkylene oxide is propylene oxide.

5. The process of claim 1 wherein the adduct is prepared by the reaction of equimolar amounts of (a), (b) and (c) at a temperature between 0° C. and 80° C. for a period of about 5 minutes to 120 minutes.

6. The process of claim 1 wherein the organic polyisocyanate is selected from the group consisting of toluene diisocyanate, methylene diphenyl diisocyanate and mixtures thereof.

7. The process of claim 1 carried out in the presence of an auxiliary blowing agent.

8. The process of claim 1 carried out in the presence of an acrylonitrile graft polyol.

References Cited

UNITED STATES PATENTS

| 3,657,161 | 4/1972 | Bernard | 260—2.5 BF |
|---|---|---|---|
| 3,645,923 | 2/1972 | Kan | 260—2.5 BF |
| 2,993,870 | 7/1961 | Burkus | 260—2.5 AC |

OTHER REFERENCES

Union Carbide Product Information Bulletin F-41322A, "NIAX Polyol 31–45," published February 1970.

DONALD E. CZAJA, Primary Examiner

C. W. IVY, Assistant Examiner

U.S. Cl. X.R.

260—2.5 AC, 2.5 AW, 77.5 NC